(12) United States Patent
Toyoda et al.

(10) Patent No.: US 7,496,330 B2
(45) Date of Patent: Feb. 24, 2009

(54) PHASE ADJUSTING METHOD AND APPARATUS

(75) Inventors: Yoshimi Toyoda, Yokohama (JP);
Hironobu Sunden, Yokohama (JP);
Sadayoshi Handa, Yokohama (JP);
Isshin Fujii, Yokohama (JP); Osamu Kaise, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 715 days.

(21) Appl. No.: 11/067,429

(22) Filed: Feb. 28, 2005

(65) Prior Publication Data

US 2006/0105728 A1    May 18, 2006

(30) Foreign Application Priority Data

Nov. 17, 2004  (JP) ............................. 2004-333230

(51) Int. Cl.
*H04B 17/00* (2006.01)
*H04B 7/00* (2006.01)

(52) U.S. Cl. .................. 455/67.16; 455/502; 455/67.11

(58) Field of Classification Search ................. 455/560, 455/550.1, 73, 67.16, 67.11, 39, 115.1, 9, 455/423, 226.1, 502; 370/350, 345, 338, 370/514
See application file for complete search history.

(56) References Cited

U.S. PATENT DOCUMENTS

| | | | | |
|---|---|---|---|---|
| 5,805,983 A * | 9/1998 | Naidu et al. | ............. | 455/67.16 |
| 6,308,077 B1 * | 10/2001 | Walsh | ......................... | 455/503 |
| 6,308,078 B1 * | 10/2001 | Van De Water | ............. | 455/503 |
| 6,552,998 B1 | 4/2003 | Matsunaga | | |
| 6,647,246 B1 * | 11/2003 | Lu | ........................... | 455/67.11 |
| 6,704,547 B2 * | 3/2004 | Kuwahara et al. | ......... | 455/67.16 |
| 7,039,098 B2 * | 5/2006 | Younis | ........................ | 375/149 |
| 7,174,133 B2 * | 2/2007 | Jecmen et al. | ........... | 455/67.16 |
| 7,218,939 B2 * | 5/2007 | Zhengdi | .................. | 455/456.1 |
| 7,319,686 B1 * | 1/2008 | Lu et al. | ...................... | 370/338 |
| 2003/0156555 A1 | 8/2003 | Sunden | | |
| 2003/0158686 A1 | 8/2003 | Sunden | | |

FOREIGN PATENT DOCUMENTS

| | | |
|---|---|---|
| EP | 1 337 056 A2 | 8/2003 |
| JP | 63-243892 | 10/1988 |
| JP | 10-285570 | 10/1998 |
| JP | 3001204 | 11/1999 |
| JP | 2000-324535 | 11/2000 |
| JP | 2002-374193 | 12/2002 |
| JP | 2003-158774 | 5/2003 |
| JP | 2003-244085 | 8/2003 |
| JP | 2003-244107 | 8/2003 |
| JP | 2003-258694 | 9/2003 |

* cited by examiner

*Primary Examiner*—Sonny Trinh
(74) *Attorney, Agent, or Firm*—Hanify & King, P.C.

(57) ABSTRACT

In a phase adjusting method and device in which a phase deviation between main signal frames themselves returned from a station end device through an antenna end device to the station end device without using a control signal for the phase adjustment, a reference signal generated in a first device is commonly mapped to respective down main signal frames of a first and a second system to be outputted to a second device, the second device maps, pointer values indicating timings of the reference signal in the respective down main signal frames to respective up main signal frames of the first and the second system to be outputted to the first device, and the first device extracts respective pointer values from the respective main signal frames and adjust frames of the respective up main signal frames based on the respective pointer values.

8 Claims, 8 Drawing Sheets

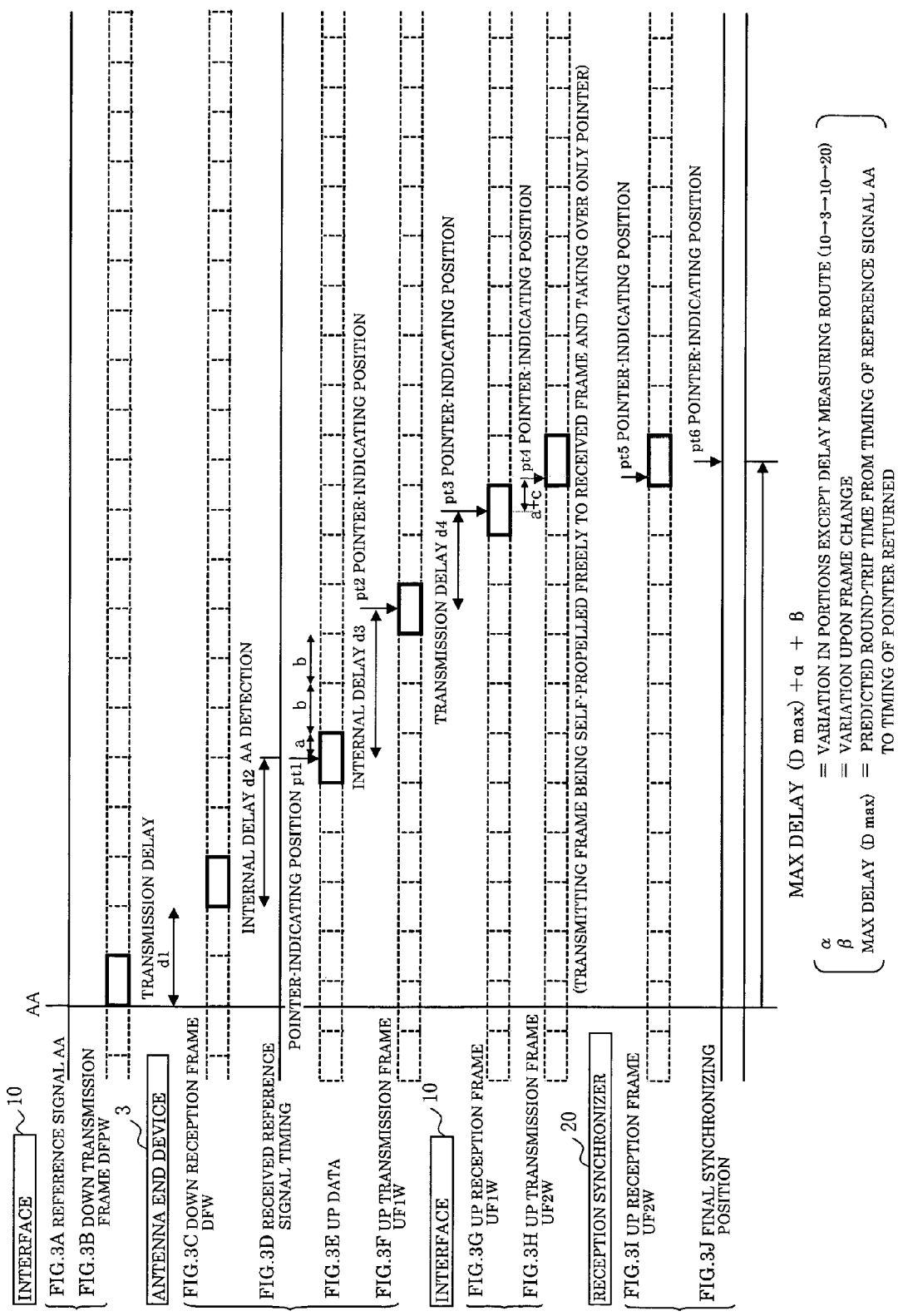

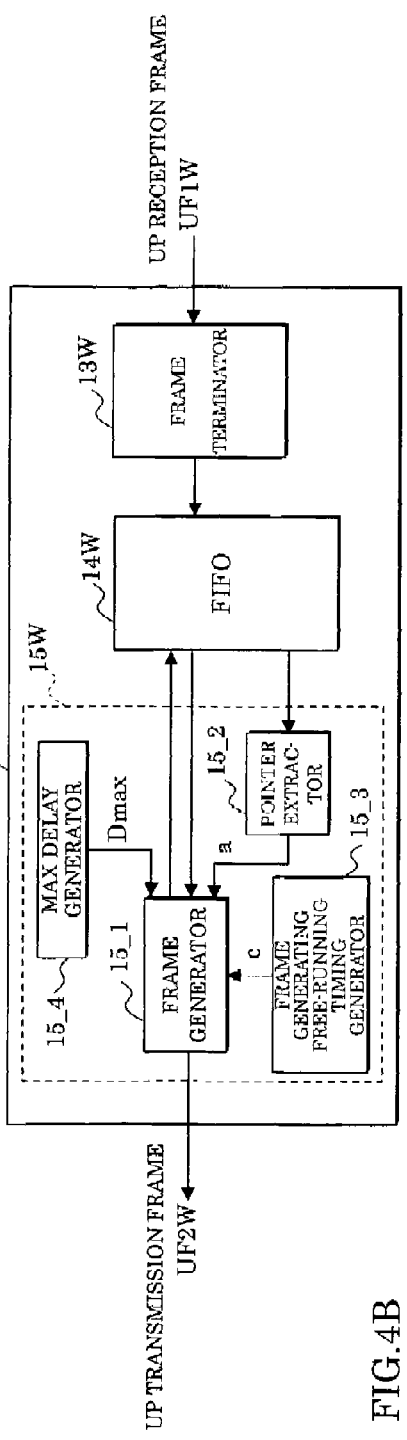
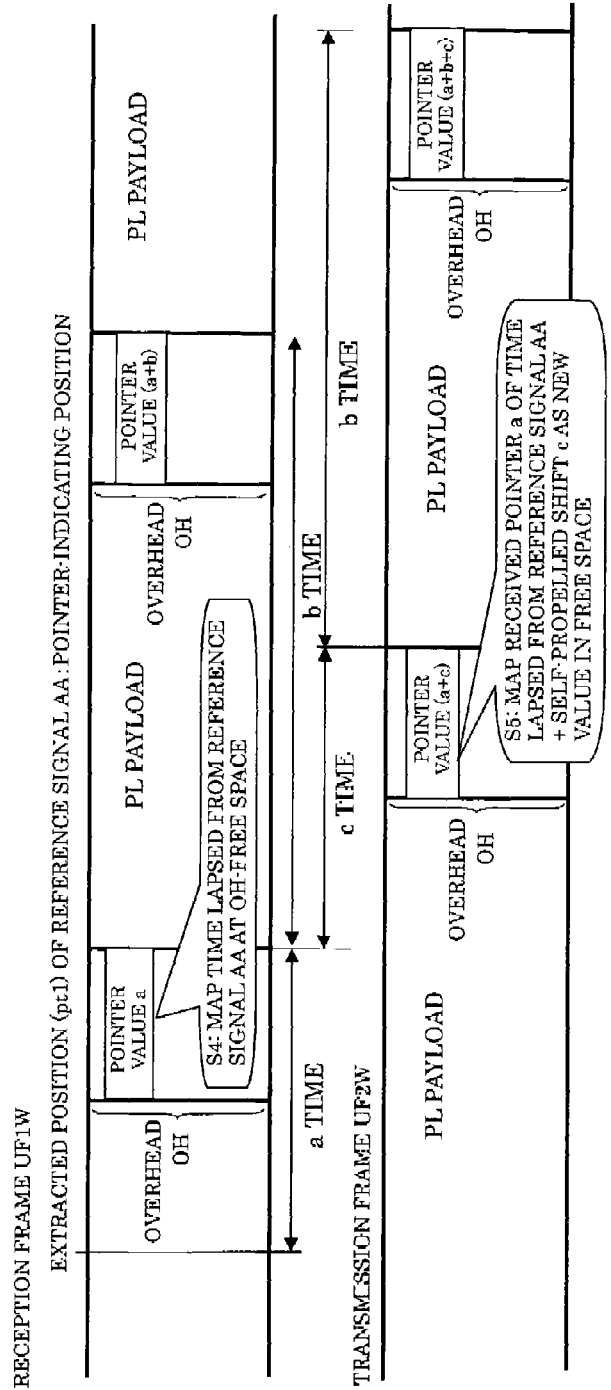
FIG. 4A
FIG. 4B
FIG. 4C

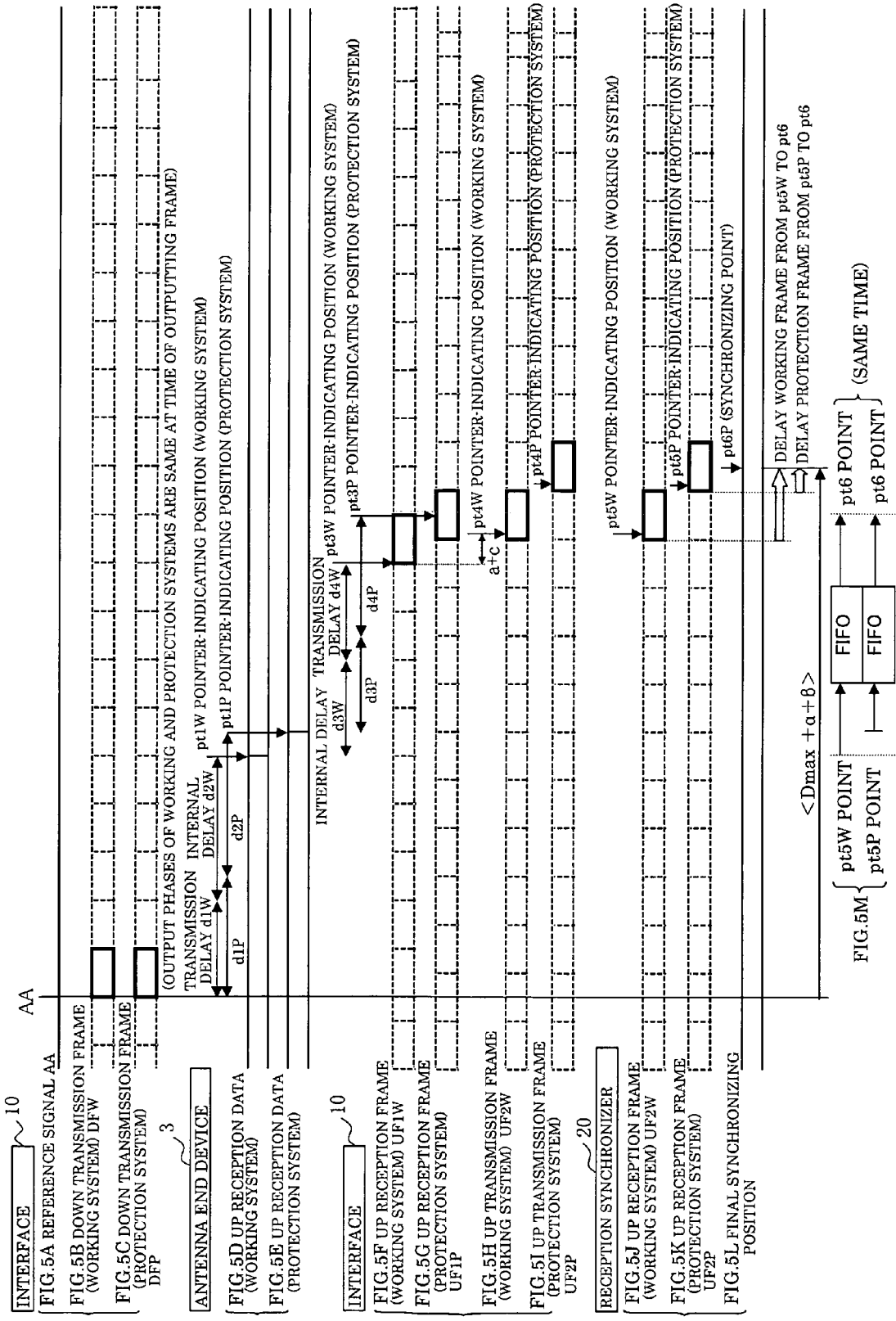

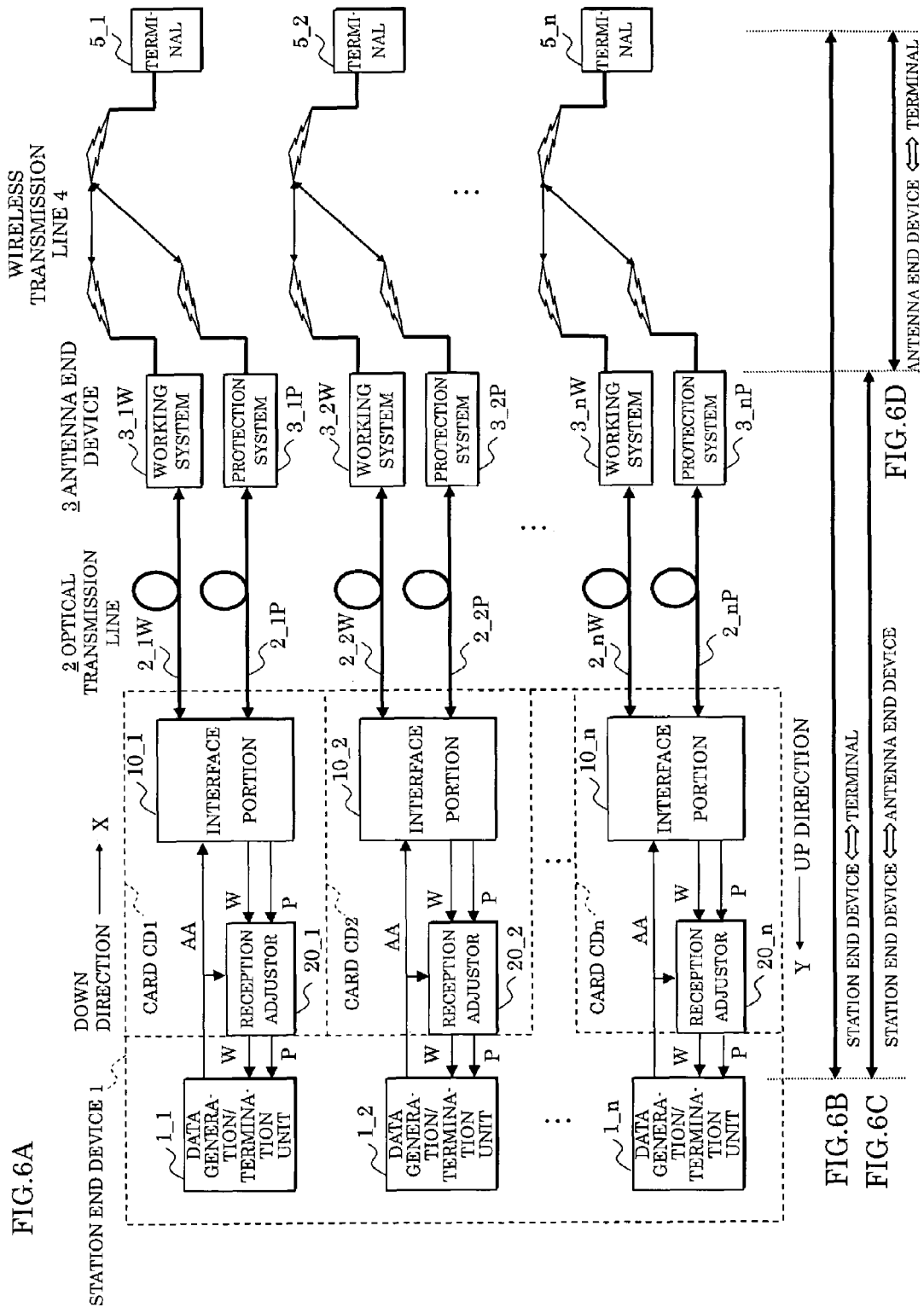

PHASE ADJUSTING METHOD AND APPARATUS

BACKGROUND OF THE INVENTION

1. Field of the Invention

The present invention relates to a phase adjusting method and apparatus, and in particular to a phase adjusting method and apparatus for adjusting data transmission (propagation) times across a plurality of systems between a station end device—an antenna end device in a wireless (radio) base station.

2. Description of the Related Art

In a wireless base station, for example, data from a station end (side) device are transmitted through an antenna end (side) device to a terminal (mobile terminal), and data from the terminal are received by the station end device through the antenna end device, where a transmission/reception system for the data forms a dual system consisting of e.g. a working (act) system and a protection (standby) system in order to continuously obtain data of a system free from deterioration.

Therefore, it is required that data reception timings at the station end device upon performing a data change (transfer) between both systems are concurrent, so that delay times from the station end device to the terminal should be the same between both systems. In this case, it is known that between the antenna end device and the terminal, little delay time difference occurs between the working system and the protection system because both systems have substantially the same route or distance, so that it is understood that the data change between the working system and the protection system can be smoothly done by making the data transmission times between the station end device and the antenna end device identical with each other between both systems.

Also, in order to specify the position of the terminal, the distance from the antenna end device to the terminal has only to be measured. In order to measure the distance from the antenna end device to the terminal, provided that a data change is performed between the working system and the protection system, the phases of both systems are adjusted or synchronized when data transmitted from the station end device as described above are returned through the antenna end device and the terminal to and received by the station end device. Then, by subtracting a delay time of data transmitted from the station end device through the antenna end device and returned to the station end device from the entire delay time of the data transmitted from the station end device through the terminal and returned to the station end device, the delay time from the antenna end device to the terminal can be measured whereby the distance from the antenna end device to the terminal can be determined. This enables the position of the terminal to be specified.

A prior art example of a wireless base station performing such a phase adjustment is shown in FIG. 8. In this prior art example, a station end device 50, an optical transmission line 2 and an antenna end device 3 compose a wireless base station, in which the antenna end device 3 is further connected to a terminal 5 through a wireless transmission line 4.

The station end device 50 comprises a FIFO (First-In-First-Out) 51 forming an interface portion serving to transmit a main signal frame to the optical transmission line 2, and a FIFO 52 forming an interface portion for receiving a main signal frame from the antenna end device. The FIFO 51 further includes a FIFO 51W for a working system and a FIFO 51P for a protection system, in which the FIFO 51W is connected to an antenna end device 3W for the working system forming the antenna end device 3 through a down optical transmission line 2_DW for the working system, and the FIFO 51P for the protection system is connected to an antenna end device 3P for the protection system forming the antenna end device 3 through a down optical transmission line 2_DP for the protection system. These antenna end devices 3W and 3P are adapted to be connected to the terminal through the wireless transmission line 4 which can be substantially regarded as the same transmission line.

Also, the FIFO 52 is composed of a FIFO 52W for the working system and a FIFO 52P for the protection system, in which the FIFO 52W interfaces a main signal frame received through an up optical transmission line 2_UW from the antenna end device 3W, and the FIFO 52P interfaces a main signal frame received through an up optical transmission line 2_UP from the antenna end device 3P for the protection system, so that they transmit the main signal frames for the working system and the protection system to a data generation/termination unit (not shown) at the next stage.

It is to be noted that the FIFO 52W and 52P are composed of a write controller (WC) 52_1, a memory (RAM) 52_2 and a read controller (RC) 52_3, respectively, in which the write controller 52_1 writes received data in the memory at a predetermined address, and the read controller 52_3 reads out data from the memory 52_2 according to the clocks of its own station end device 50, whereby the main signal frame from the optical transmission line 2 is changed to the main signal frames for the working system and the protection system at the station end device 50 to be provided as an output.

On the other hand, there has been proposed a W-CDMA radio base station and delay time correction method therefor as follows: In a radio device of the 0-system, an input signal is divided into two, and a signal is provided to a delay time detection control circuit. Also, an output signal is divided into two, and a signal is provided to the circuit. In the circuit, the amplitude fluctuation pattern is compared with the amplitude fluctuation pattern, matching timing difference is detected as a delay time with respect to, and a delay-adjusting time in the device is controlled so that the delay time is set at a set value. Similarly, in the 1-system, a delay-adjusting time in a radio device is controlled (see patent document 1).

Also, there has been proposed a W-CDMA wireless base station and delay time difference correcting method therefor as follows: At the time of IPDL (individual physiological data logger), BB (base band) signals are outputted from idle circuits, in a non-transmission state. A carrier is modulated with a transmission signal of a system 0 in an RF (radio frequency) circuit, is outputted as an RF signal, is distributed by a directional coupler, and is detected by a detector and inputted into a control circuit. Similarly, a transmission signal of a system is inputted into the circuit through an RF circuit, a directional coupler and a detector. In the circuit, delay time deviation is detected on the basis of the rise edges of transmission signal of a system 0 and a transmission signal of a system 1, control signals are respectively outputted to delay adjusting circuits to correct the delay time deviation. In the circuits, the delay time is adjusted (see patent document 2).

Also, there has been proposed a transmission diversity delay correcting system, which uses a TSTD system including a system 0, having a transmitting and receiving function and a system 1 having a transmitting and receiving function as well, is equipped with a transmission system means which processes transmit data and sends an RF signal and a reception system means, which receives and processes the RF signal and outputs receive data for the 0-system or 1-system respectively; and the transmission system means of the 0-system or 1-system and the reception system means of the 1-system or 0-system are combined and the delay quantity of a delay-adjusting circuit which is provided for the transmission system means of the 0-system or 1-system is shifted, until the receive data of the 1-system or 0-system can be decoded (see patent document 3).

Also, there has been proposed a delay amount/transmission level setting system is bidirectional communicating system as follows: The center station measures the reciprocating propagation delay amount of signals when the subscriber station starts the operation and sets the transmission delay amount of the subscriber station so as to make the measured reciprocating propagation delay amount be equal to the system delay amount of a fixed value to the subscriber station. When the link changeover from an active system to a standby system is generated by the generation of a fault in a relay transmission line, the center station measures the reciprocating propagation delay amount of the signals to one subscriber station after the link changeover and resets the transmission delay amount of all the subscriber stations connected to the repeater station altogether based d on a difference from the reciprocation propagation delay amount of the signals to the entire subscriber station before the link changeover (see patent document 4).

Also, there has been proposed a phase adjusting device as follows: At the time of automatic phase adjustment, a switching signal is supplied to a signal integrating board, a dummy integrating board, and a phase adjusting circuit of a control station, and a switching signal is supplied to a signal integrating board, a dummy integrating board, and a control circuit of a radio base station. As the result, signal integrating boards are switched to dummy integrating boards. Then, the current system is equivalently switched to the stand-by system with respect to the operation of the whole of a device. A down control signal as phase adjustment data is sent from a signal generating circuit by the control of a phase adjusting circuit and is supplied to both of signal integrating boards and dummy integrating boards (see patent document 5).

Also, there has been proposed a system delay correcting circuit as follows: A trigger use pulse which is generated is supplied to variable delaying circuits through a directional coupler and a dual receiver, as an artificial question signal, through an artificial question signal generating circuit. An artificial question pulse outputted from the circuits is sent out as an artificial answer signal through a modulated pulse generating circuit and a circulator. Apart of this artificial answer signal is supplied to a gate circuit, as time information of an artificial answer pulse through a directional coupler and a time detecting circuit. The circuit stops counting of a counter circuit, and measures a system delay. Also, in an averaging circuit, a drift is averaged. A controlled variable adjusting circuit drives the variable delaying circuits by using a difference between a system delay measured value and a prescribed value from a deciding circuit, as a correction quantity, and outputs a signal for varying the delay quantity (see patent document 6).

Also, there has been proposed a phase matching control system including a transmitter for transmitting same data; and a receiver for receiving the data; each of transmission sections in the transmitter includes frame generation transmission sections for generating frames with a period twice a maximum prediction delay or over, inserting phase information indicative the phase of each frame to the frame, and each of the reception sections includes phase matching sections for receiving the frame and the phase information, matching phases of the corresponding frames in a plurality of the transmission lines on the basis of the phase information and providing an output (see patent document 7).

Also, there has been proposed a phase difference delay control system as follows: between the reference position and the terminal, a first interface part and a second interface part are provided with a clock transfer part, respectively, for adding an overhead containing phase information for phase matching of a redundant signal and transmitting it to a transmission line, or for eliminating the overhead from a signal from the transmission line and transmitting the signal to the terminal or the reference position. A changing amount of phase difference between writing and reading in one clock transfer part out of the clock transfer parts operating in response to a reference clock signal is informed to the other clock transfer part. The changing amount is added to or subtracted from initial phase difference when the phase difference is initialized (see patent document 8).

Also, there has been proposed a frame synchronizing device in mobile communication system as follows: A transmission delay time calculating means sends a message for transmission time measurement to each base station and statistically calculate the transmission time to the base station from its response time and a frame synchronism control means sends a frame synchronism message including its transmission time information to each base station. Each base station having received the frame synchronism message generates frame timing by a frame timing generating means by using the transmission time information to synchronize the frame timing among base stations connected by the IP network (see patent document 9).

[patent document 1] Japanese Patent Application Laid-open No. 2003-258694

[patent document 2] Japanese Patent Application Laid-open No. 2003-158774

[patent document 3] Japanese Patent Application Laid-open No. 2002-374193

[patent document 4] Japanese Patent Application Laid-open No. 10-285570

[patent document 5] Japanese Patent No. 3001204

[patent document 6] Japanese Patent Application Laid-open No. 63-243892

[patent document 7] Japanese Patent Application Laid-open No. 2003-244085

[patent document 8] Japanese Patent Application Laid-open No. 2003-244107

[patent document 9] Japanese Patent Application Laid-open No. 2000-324535

In the prior art example shown in FIG. 8, a phase synchronization (adjustment) between the working main signal frame and the protection main signal frame respectively outputted from the FIFOs 52W and 52P in the station end device 50 is performed not with the main signal frames themselves, but with a control signal (not shown) returned through the station end device 50—the optical transmission line 2—the antenna end device 3—the station end device 50. Therefore, such a phase adjustment is not performed by observing the phase deviation (shift or displacement) between the working and the protection main signal frame themselves, so that a phase deviation may occur between the working main signal frame and the protection main frame outputted by the station end device 50.

SUMMARY OF THE INVENTION

It is accordingly an object of the present invention to provide a phase adjusting method and device in which a phase deviation between main signal frames themselves returned from a station end device that is a first device through an antenna end device that is a second device to the station end device without using a control signal is detected for the phase adjustment.

For solving the above problem, a phase adjusting method according to the present invention comprises: a first step of commonly mapping a reference signal generated in a first device to respective down main signal frames of a first and a second system to be outputted to a second device; a second step of mapping, at the second device, respective pointer values indicating timings of the reference signal in the respective down main signal frames to respective up main signal frames of the first and the second system to be outputted to the first device; and a third step of extracting, at the first device, the respective pointer values from the respective up main signal frames and adjusting phases of the respective up main signal frames based on the respective pointer values.

The principle of a phase adjusting method according to the present invention will now be described by referring to FIG. 1.

At first, a station end device (first device) 1 adds a reference signal AA generated within a station end device 1 to respective down main signal frames DFW and DFP for a working system and a protection system that are a first system and a second system, to be transmitted to an optical transmission line 2 (first step S1).

An antenna end device (second device) 3 having received the down main signal frames DFW and DFP through the optical transmission line 2 extracts the reference signal AA in the down main signal frames DFW and DFP, and adds pointer values pt indicating the timings (phases) thereof respectively to an up main signal frame UFW (working system) and an up main signal frame (protection system) transmitted from the terminal 5 through a wireless transmission line 4, to be provided to the station end device 1 (second step S2).

The station end device 1 extracts the respective pointer values pt from the up main signal frames UFW and UFP to adjust the phases of the up main signal frames UFP and UFW based on the respective pointer values pt (step S3).

Namely, in order to measure a delay time (virtual distance) from the station end device 1 to the antenna end device 3, the reference signal AA generated within the station end device 1 is mapped to (in or onto) the down main signal frames DFW and DFP as a reference time (point) to be outputted to the antenna end device 3. The antenna end device 3 extracts the reference signal AA in the down main signal frames DFW and DFP, and re-maps the timings of the reference signal AA to the up main signal frames as new pointer values. The station end device 1 extracts the new pointer values re-mapped, and performs waiting the up main signal frames so that a time deviation between both systems may be coincident, for the phase adjustment.

Therefore, a change from the working system to the protection system can be done without a phase deviation and occurrence of signal interruption or duplication.

Also, the round-trip delay times between the station end device 1 and the antenna end device 3 in the respective systems become the same. Therefore, it becomes possible to calculate a delay time (corresponding to a distance) from the antenna end device 3 through the wireless transmission line 4 to the terminal 5 by subtracting a round-trip delay time between the station end device 1 and the antenna end device 3 from a round-trip delay time from the station end device 1 and the terminal 5, enabling the position of the terminal 5 to be specified.

For realizing a phase adjusting method according to the present invention as above described, a phase adjusting apparatus comprising: a first device generating and commonly mapping a reference signal to respective down main signal frames of a first and a second system to be outputted; and a second device mapping respective pointer values indicating timings of the reference signal in the respective down main signal frames from the first device to respective up main signal frames of the first and the second system to be outputted to the first device; the first device extracting the respective pointer values from the respective up main signal frames from the second device and adjusting phases of the respective up main signal frames based on the respective pointer values.

The above-described second device may set, as the respective pointer values, times from a point when the reference signal is extracted to data head points of the respective up main signal frames in free spaces of headers of the respective up main signal frames.

Also, the above-described first device may comprise an interface portion setting, when the respective up main signal frames from the second device are changed to frames for the first device, the extracted pointer values and a predicted round-trip time from the timing of the reference signal to points when the pointer values are returned in free spaces of the frames changed, and a reception adjustor extracting the predicted round-trip time and adjusting the phases of the respective up main signal frames from the interface portion based on the pointer values with the predicted round-trip time being made a center.

The above-described first and second systems may respectively comprise a working system and a protection system, in which the first device performs a phase adjustment between the working system and the protection system.

This enables data free from deterioration in both systems to be continuously taken out.

The above-described system may comprise a card, in which the first device may perform a phase adjustment between all of the cards.

Namely, such a phase adjustment can be made not only in a single card having held therein the working system and the protection system as above-described but also among a plurality of cards regardless of existence of the working system and/or the protection system.

Furthermore, the above-described first and second systems may respectively comprise a working system and a protection system, in which a plurality of cards including at least one of the working system and the protection system are provided, so that the first device performs a phase adjustment between the working system and the protection system in all of the cards.

Namely, in view of a case where there are both systems of the above-noted working and protection systems within a single card as well as a case where there is only one of both systems, such a phase adjustment can be made in either case.

The following effects can be achieved according to the present invention:

(1) Without using a control signal, it becomes possible to adjust delay amounts irrespective of communications between main signal frames in a plurality of systems, so that the data change (transfer) can be smoothly done between the systems.

(2) It becomes possible to make a fine adjustment because of a phase adjustment using a predicted round-trip time.

(3) It becomes possible to adjust a round-trip delay amount between an up main signal frame and a down main signal frame.

(4) It becomes possible to adjust delay amounts across cards (or slots).

(5) It has little effect on maintenance operations.

BRIEF DESCRIPTION OF THE DRAWINGS

The above and other objects and advantages of the invention will be apparent upon consideration of the following detailed description, taken in conjunction with the accompanying drawings, in which the reference numerals refer to like parts throughout and in which:

FIGS. 3A-3J are time charts only for the working system of the embodiment (1) shown in FIG. 2;

FIGS. 4A-4C are diagrams showing detailed embodiments of an interface portion shown in FIG. 2 and frames;

FIGS. 5A-5M are time charts showing the time charts in FIG. 3 for both of the working system and the protection system;

FIGS. 6A-6D are diagrams showing an embodiment (2) of a phase adjusting method and apparatus according to the present invention;

DESCRIPTION OF THE EMBODIMENTS

Embodiment (1)

Figure 1:
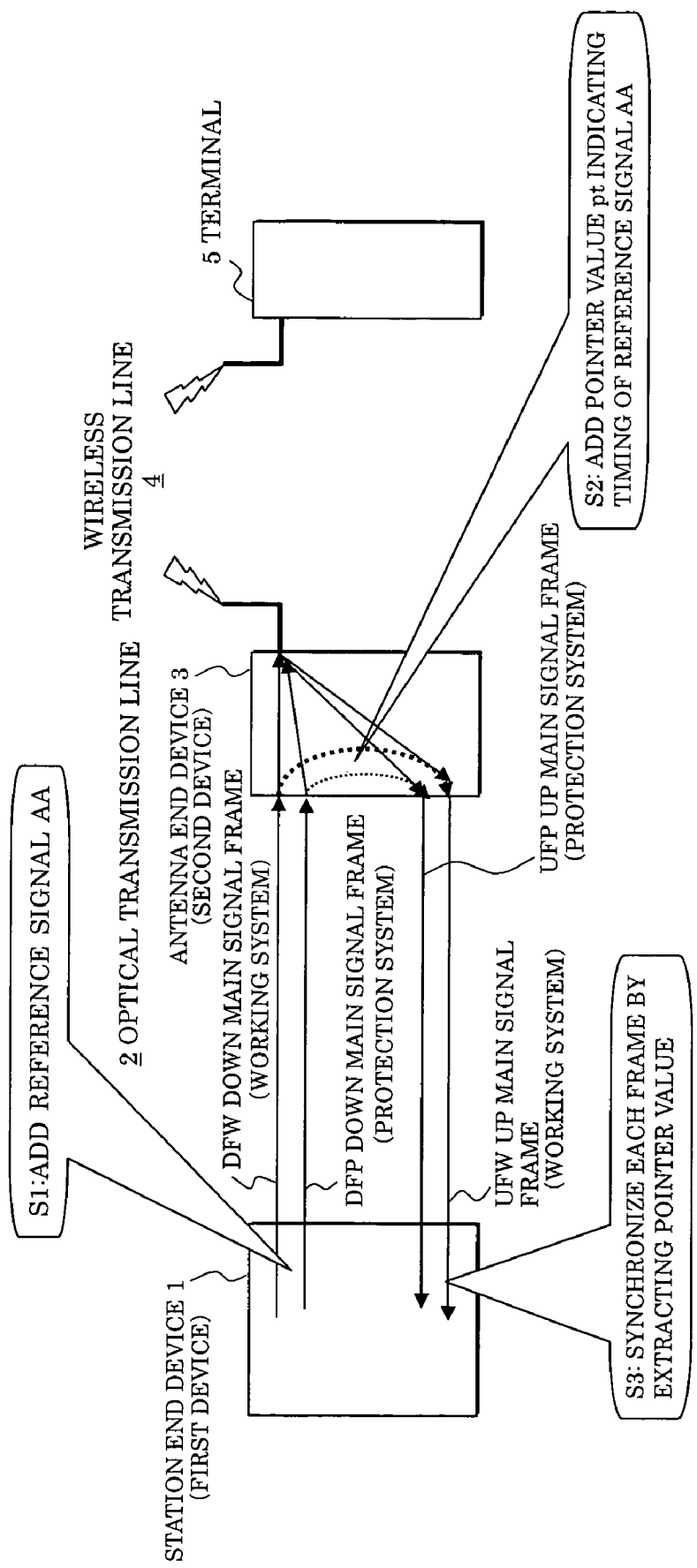
FIG. 1 is a block diagram showing the principle of a phase adjusting method and apparatus according to the present invention.
Figure 2:
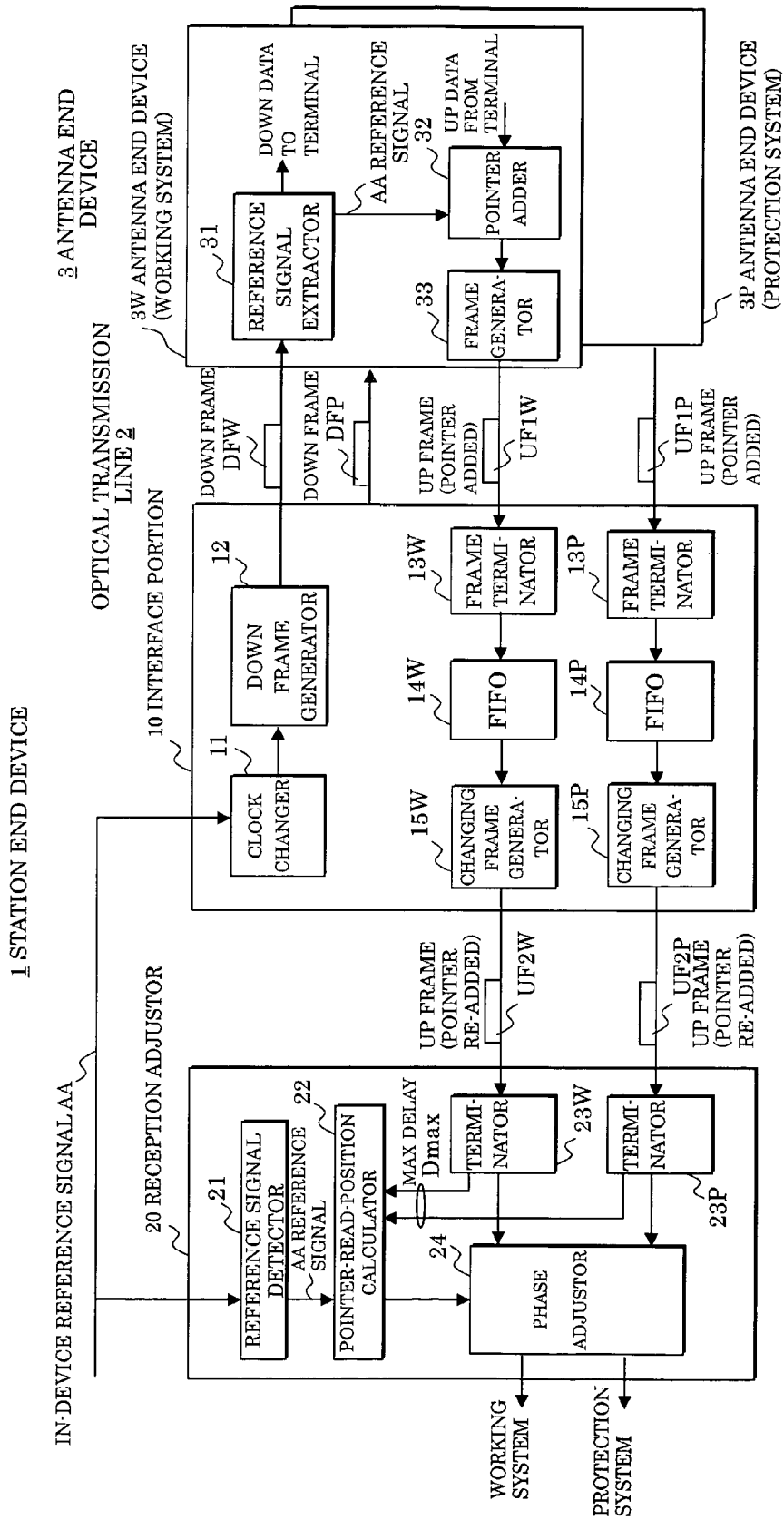
FIG. 2 is a block diagram showing an embodiment (1) (phase adjustment between a working system and a protection system) of a phase adjusting method and apparatus according to the present invention.

FIG. 2 shows an embodiment (1) of a phase adjusting device which realizes a phase adjusting method according to the present invention. In this embodiment (1), a station end device 1, an optical transmission line 2 and an antenna end device 3 form a wireless base station in the same manner as FIG. 1. The station end device 1 is formed of an interface portion 10 and a reception adjustor 20.

The interface portion 10 includes, in the down direction, a clock changer 11 for changing clocks (CLK) within the station end device 1 to clocks in the optical transmission line 2 in response to a reference signal AA generated within the device 1, and a down frame generator 12 for generating a down main signal frame DFW based on data from the clock changer 11 to be transmitted to the optical transmission line 2.

It is to be noted that while in this embodiment, only the clock changer 11 and the down frame generator 12 are shown for the working system, a clock exchanger and a down frame generator are similarly provided also in the protection system not shown, in which a down main signal frame DFP is transmitted from the down frame generator to the optical transmission line 2.

This interface portion 10 shows an arrangement for both of the working system and the protection system with respect to the up direction. Namely, the interface portion 10 in the working system includes a frame terminator 13W which terminates an up main signal frame UF1W transmitted from a working antenna end device 3W, a FIFO 14W which once stores the up main signal frame UF1W terminated by the frame terminator 13W and a changing frame generator 15W which outputs an up main signal frame UF2W changed based on the clock of the station end device 1 upon an up main signal frame being read out of the FIFO 14W.

Similarly, as to the protection system, the interface portion 10 includes a frame terminator 13P which terminates an up main signal frame UF1P from a protection antenna end device 3P, a FIFO 14P which stores the main signal frame UF1P terminated by the frame terminator 13P, and a changing frame generator 15P which outputs an up main signal frame UF2P where the clock of the optical transmission line 2 is changed to the clock of the station end device 1 when an up main signal frame is read out of the FIFO 14P.

The working antenna end device 3W forming the antenna end device 3 includes a reference signal extractor 31 which inputs a down main signal frame DFW from the working down frame generator 12 in the interface portion 10 and extracts the reference signal AA mapped thereto, a pointer adder 32 which adds a pointer value indicating the timing position of the reference signal AA to a free space in a frame header of up data from the terminal 3, and a frame generator 33 which generates a frame having a header added with a pointer value at the pointer adder 32 and transmits it as the up main signal frame UP1W. This also applies to the protection antenna end device 3P.

The reception adjustor 20 in the station end device 1 includes a reference signal detector 21 which detects the reference signal AA, a pointer-read-position calculator 22 which calculates a pointer-read-position based on the reference signal AA and a maximum delay (amount) Dmax as will be described later, terminators 23W, 23P, which extracts the above maximum delay Dmax from the up main signal frames UF2W, UF2P, and a phase adjustor 24 which makes a phase adjustment between the working main signal frame and the protection main signal frame based on pointer values similarly extracted by the terminators 23W, 23P as well as a pointer-read-position from the pointer-read-position calculator 22.

The operation of this embodiment (1) will now be described referring to FIGS. 3A-3J to FIGS. 5A-5L. It is to be noted that FIGS. 3A-3J show time charts (1) only for the working system, FIGS. 4A-4C show only the working system on the up line in the interface portion 10, and FIGS. 5A-5L show time charts (2) both for the working system and the protection system.

In the interface portion 10, when the clock changer 11 receives the in-device reference signal AA shown in FIG. 3A, it provides data mapped with the reference signal AA where the clocks of station end device 1 are changed to clocks of the optical transmission line 2, to the down frame generator 12, which then transmits the down transmission frame DFW shown in FIG. 3B to the reference signal extractor 31 in the working antenna end device 3W through the optical transmission line 2.

The reference signal extractor 31 of the antenna end device 3W receives the down main signal frame DFW from the down frame generator 12 as a down reception frame shown in FIG. 3C, with a transmission delay d1. This reference signal extractor 31 extracts the reference signal AA at a timing shown in FIG. 3D, i.e. a timing delayed by an internal delay d2 from a reception (time) point of the down frame DFW. The point at which the reference signal AA was extracted corresponds to a position pt1 indicated by a pointer, which will be hereinafter occasionally referred to as pointer-indicating position, as will be described.

Namely, in the up data from the terminal 5 through the wireless transmission line 4 shown in FIG. 3E, a time interval "a" from the position pt1 (extracted position of the reference signal AA) indicated by the pointer to the head of data (payload) of the next frame assumes a pointer value. The up transmission frame UF1W shown in FIG. 3F having mapped thereto the pointer value "a" is to be delayed by an internal delay d3 and outputted to the frame generator 3.

One example of this up transmission frame UF1W is shown in FIG. 4B. This shows that a time interval "a" from the point at which the reference signal AA is extracted at the reference signal extractor 31, i.e. the pointer-indicating position pt1, to the first data head position is mapped as the pointer value "a" to a free space of the overhead OH. In the next frame, therefore, a pointer value "a+b" is to be mapped to the overhead OH as shown in figure. It is to be noted that "b" is a time corresponding to a single frame.

In the antenna end device 3, therefore, the up transmission frame UF1W having a pointer-indicating position pt2 at a point delayed by an internal delay d3 from the pointer-indicating position pt1 with respect to the up data is to be transmitted.

The interface portion having received the above up reception frame UF1W is shown in FIG. 4A only for the working system on the up line. As shown in FIG. 3G, the up reception frame UF1W is inputted into the frame terminator 13W, having a pointer-indicating position pt3 at a point delayed by a transmission delay d4 from the pointer-indicating position pt2 in the up transmission frame UF1W from the antenna end device 3. After the frame termination at the frame terminator 13W, the up reception frame UF1W is stored in the FIFO 14W.

The changing frame generator 15W connected to the FIFO 14W is formed of, as shown in FIG. 4A, a frame generator 15_1, a frame pointer extractor 15_2, a frame generating free-running (self-propelling) timing generator 15_3 and a maximum delay generator 15_4. The pointer extractor 15_2 extracts the pointer value "a" shown in FIG. 4B from the up reception frame UF1W stored in the FIFO 14W to be provided to the frame generator 15_1. The frame generator 15_1 is continuously provided with a free-running timing "c" for clocks specific to the station end device 1 from the frame generating free-running timing generator 15_3, so that the clocks in the optical transmission line 2 are changed to the clocks in the station end device 1 to transmit the up transmission frame UF2W.

Therefore, the up transmission frame UF2W is re-mapped with, as shown in FIG. 4C, a pointer value "a+c"=the above pointer value "a"+a time interval "c" delayed by the frame free-running generation timing, as a new pointer value in a free space of the overhead OH. In this occasion, the changing frame generator 15W performs not only such a frame change but also a similar embedment of the maximum delay Dmax from the maximum delay generator 15_4 into a free space of the overhead OH of the frame. This maximum delay Dmax is a predicted round-trip time, predetermined by an experiment or the like, from the generation timing of the reference signal AA until the pointer value is returned, which indicates that the pointer value can be extracted more rapidly by extracting the pointer value with the maximum delay Dmax being made a center.

Thus, from the interface portion 10, the up transmission frame UF2W with the pointer value re-added is transmitted to the reception adjustor 20. Accordingly, the pointer value at this time is "a+c" as shown in FIG. 3H, in which the up transmission frame UF2W free-runs independently of the reception frame UF1W, taking over only the pointer value.

In the reception adjustor 20 having received the up transmission frame UF2W as shown in FIG. 3I, the pointer-indicating position assumes pt5 where the delay is neglected, which is transmitted by the terminator 23_W to the phase adjustor 24. At the same time, the terminator 23W extracts the maximum delay Dmax generated from the maximum delay generator 15_4, transmitted to the frame generator 15_1 and added to the overhead OH, and provides it to the pointer-read-position calculator 22. It is to be noted that also in the terminator 23P the same operation is made regarding the up reception frame UF2P.

The pointer-read-position calculator 22 having thus received the maximum delay Dmax from the terminator 23W adds the maximum delay Dmax with the reference signal AA detected at the reference signal detector 21, thereby transmitting the pointer-read-position to the phase adjustor 24. This assumes, as shown in FIG. 3J, a pointer-indicating position pt6. With the pointer-indicating position pt6 being made a reference (center of window), the pointer value "a+c" from the terminator 23W and a pointer value (not shown) from the terminator 23P are mutually adjusted in position, whereby the main signal frames of the working system and the protection system are provided as outputs in the form of phase adjusted.

It is to be noted that while as shown in FIG. 3 the pointer-indicating portion pt6 is added with $\alpha$ and $\beta$ in addition to the maximum delay Dmax, $\alpha$ indicates a variation not included in a delay measuring route other than the above delays d1-d4, and $\beta$ indicates a variation upon the frame change.

FIGS. 5A-5M show time charts (2) for both of the working system and the protection system while the time charts (1) shown in FIGS. 4A-4C show only the working system. Therefore, for simplification of figures, time charts with respect to FIGS. 3C, 3D, and 3F are omitted.

Namely, in the interface portion 10, when the reference signal AA shown in FIG. 5A is mapped to the down transmission frames DFW and DFP respectively shown in FIGS. 5B and 5C and transmitted to the antenna end device 3, the antenna end device 3 sets pointer-indicating positions pt1W, pt1P respectively having transmission delays d1W, d1P and internal delays d2W, d2P as shown in FIGS. 5D and 5E.

Then, the interface portion 10 obtains, as shown in FIGS. 5F and 5G, pointer-indicating positions pt3W and pt3P through internal delays d3W, d3P and transmission delays d4W, d4P from the up reception frames UF1W and UF1P from the antenna end device 3.

Figure 7:
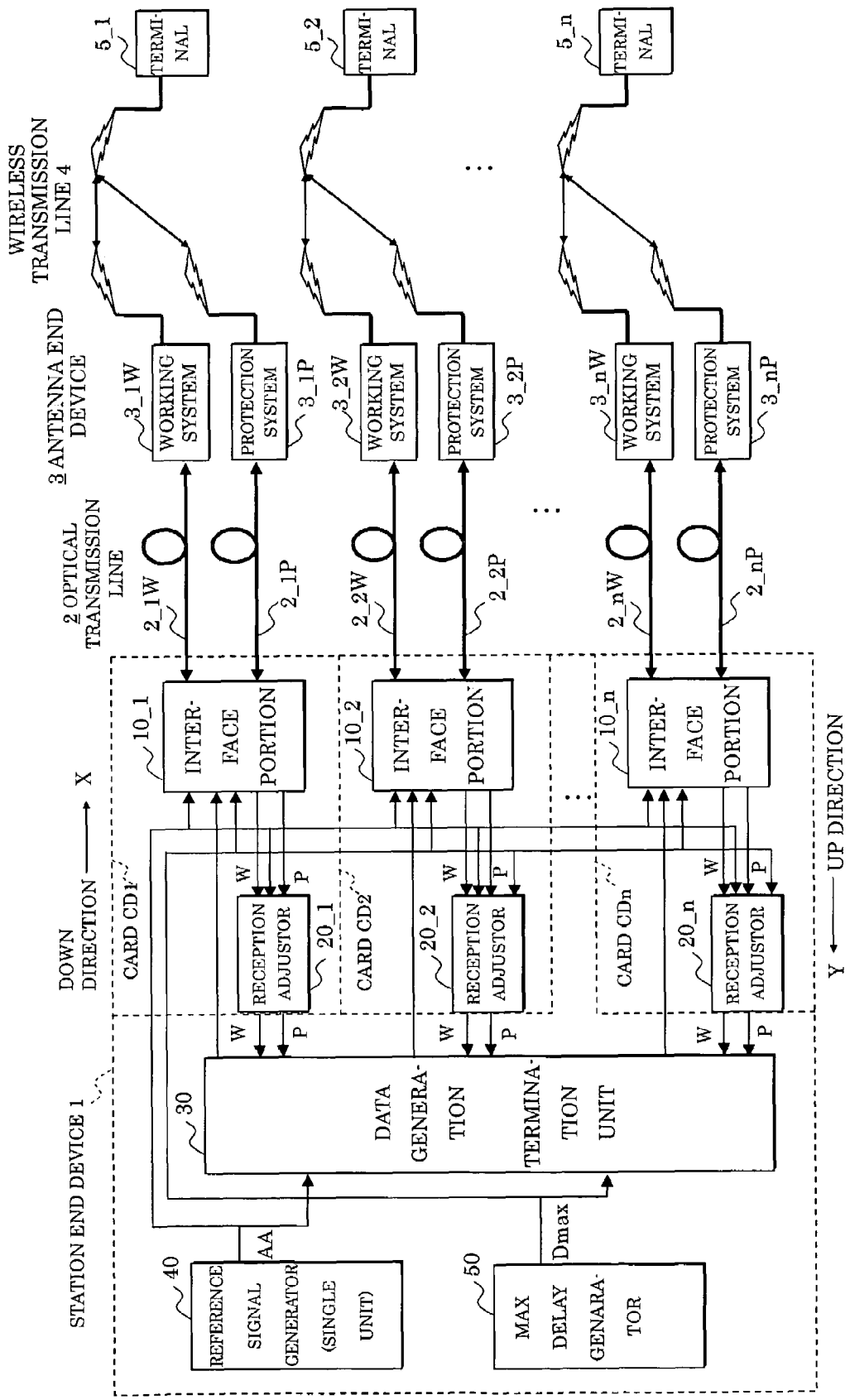
FIG. 7 is a block diagram showing an embodiment (3) of a phase adjusting method and apparatus according to the present invention.
Figure 8:
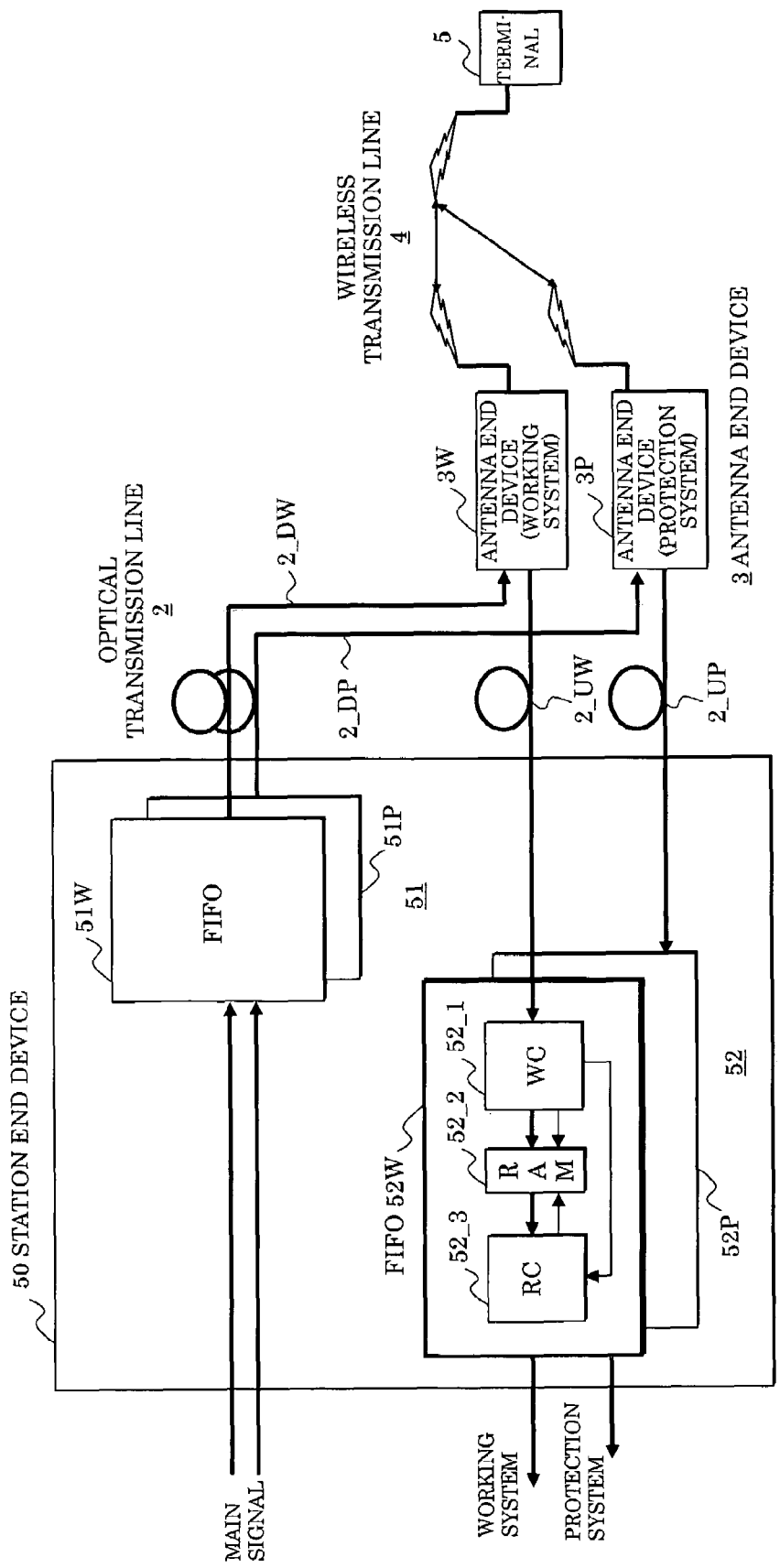
FIG. 8 is a block diagram showing a prior art example.

When the up transmission frames UF2W and UF2P are transmitted from the interface portion 10, the pointer-indicating positions assume pt4W and pt4P as shown in FIGS. 5H and 5I, indicating that the pointer values have been re-added or changed to the pointer value "a+c" in relation to FIGS. 5F and 7. In the reception adjustor 20, from the up reception frames UF2W and UF2P, the pointer-indicating positions assume ptW and pt5P as shown in FIGS. 5J and 5K, so that the final phase adjusting position assumes, as shown in FIG. 5L, a phase-adjusting point (pointer-indicating position) pt6 in consideration of the maximum delay Dmax+$\alpha$+$\beta$.

This indicates, as shown in FIG. 5M, that the pointer-indicating position is delayed from pt5W to pt6 for the working main signal frame while it is delayed from pt5P to pt6 for the protection main signal frame, thereby realizing a concurrent reception at the phase adjusting point pt6. This delay operation can be done by using the FIFO or the like.

Embodiment (2)

This embodiment (2) is shown in FIGS. 6A-6D and is different from the embodiment (1) shown in FIG. 2 in that there are provided cards CD1-CDn respectively comprising the embodiment (1). Namely, the station end device 1 shown in FIG. 6 is formed of n units of cards CD1-CDn, in which the card CD1 is formed of an interface portion 10_1 and a reception adjustor 20_1, the card CD2 is formed of an interface portion 10_2 and the reception adjustor 20_2, ..., and the nth card CDn is formed of an interface portion 10_n and a reception adjustor 20_n. These cards CD1-CDn are respectively connected to data generation/termination units 1_1-1_n.

Moreover, the interface portions 10_1-10_n are respectively connected to working antenna end devices 3_1W, 3_1P-3_nW, 3_nP in the antenna end device 3 respectively with optical transmission lines 2_1W, 2_1P-2_nW, 2_nP. The antenna end device 3 is connected to terminals 5_1-5_n through the wireless transmission line 4.

Therefore, by measuring a delay time between the station end device 1 and the terminal 5 as shown in FIG. 6B, and then measuring a delay time between the station end device 1 and the antenna end device 3 as shown in FIG. 6C, a delay time between the antenna end device 3 and the terminal 5 can be measured as shown in FIG. 6D, enabling the position of the terminal 5 to be estimated.

Embodiment (3)

This embodiment (3) is shown in FIG. 7, in which a data generation/termination unit 30 of a single unit is substituted for the data generation/termination units 1_1-1_n in the embodiment (2) as shown in FIG. 6A, and a reference signal generator 40 of a single unit is provided to transmit the reference signal AA to the data generation/termination unit 30, the interface portions 10_1-10_n and the reception adjustors 20_1-20_n. Furthermore, a maximum delay generator 50 is provided as a common unit in the station end device 1, so that the maximum delay Dmax is provided to the data generation/termination unit 30 and the interface portions 10_1-10_n.

The reason why a phase adjustment is performed between the cards is as follows:

A place for measuring a distance from the antenna end device 3 to the terminal 5 resides not in each of the cards but in the data generation/termination unit 30 in the latter stage. Namely, no processing for the data contents is made in each of the cards. Therefore, by adjusting times (distances) at the position outputting the up data from the cards up to the antenna end device 3, the data generation/termination unit 30 at the latter stage can regard a phase difference, if any in the data returned, as the distance from the antenna end device 3 to the terminal 5, thereby grasping the distance from the antenna end device 3 to the terminal 5.

Therefore, as above-described, the reference signal AA is generated at a single place in the station end device 1 and is distributed to each of the cards. Also, the maximum delay Dmax is generated at a single place, i.e. in the maximum delay generator 50 in the station end device 1, and is distributed to the cards CD1-CDn and the data generation/termination unit 30. A portion which finally calculates the distance from the antenna end device 3 to the terminal 5 is the data generation/termination unit 30. Since the generation/termination of the data is made by not each of the cards but the data generation/termination unit 30 at a single place, the card calculating distance is the same, and a phase difference between the cards disappears when the data are returned to the same position in case of the same distance per card, the distance from the antenna end device 3 to the terminal can be simply obtained.

It is to be noted that while in the case of the embodiment (3) shown in FIG. 7, each card is shown having both of the working system and protection system, it becomes unnecessary to make a phase adjustment between the working system and the protection system if both of the working system and the protection system are not used but only one of them is used. Namely, this applies to a case where e.g. the card CD1 uses both of the working system and the protection system but the card CD2 only uses the working system 2.

This is because some cards or antenna end devices can not be replaced at a time from the old ones to new ones wherein the old ones should be used as they are, with adding new cards and antenna end devices. It is required to consider a possibility of both cases in which newly added cards are mounted with the arrangement of the present invention while the old cards or antenna end devices without the function of the present invention are used as they are.

The invention claimed is:

1. A phase adjusting method comprising:
   a first step of commonly mapping a reference signal generated in a first device to respective down main signal frames of a first and a second system to be outputted to a second device;
   a second step of mapping, at the second device, respective pointer values indicating timings of the reference signal in the respective down main signal frames to respective up main signal frames of the first and the second system to be outputted to the first device; and
   a third step of extracting, at the first device, the respective pointer values from the respective up main signal frames and adjusting phases of the respective up main signal frames based on the respective pointer values.

2. A phase adjusting apparatus comprising:
   a first device generating and commonly mapping a reference signal to respective down main signal frames of a first and a second system to be outputted; and
   a second device mapping respective pointer values indicating timings of the reference signal in the respective down main signal frames from the first device to respective up main signal frames of the first and the second system to be outputted to the first device;
   the first device extracting the respective pointer values from the respective up main signal frames from the second device and adjusting phases of the respective up main signal frames based on the respective pointer values.

3. The phase adjusting apparatus as claimed in claim 2, wherein the second device sets, as the respective pointer values, times from a point when the reference signal is extracted to data head points of the respective up main signal frames in free spaces of headers of the respective up main signal frames.

4. The phase adjusting apparatus as claimed in claim 3, wherein the first device comprises an interface portion setting, when the respective up main signal frames from the second device are changed to frames for the first device, the extracted pointer values and a predicted round-trip time from the timing of the reference signal to points when the pointer values are returned in free spaces of the frames changed, and a reception adjustor extracting the predicted round-trip time and adjusting the phases of the respective up main signal frames from the interface portion based on the pointer values with the predicted round-trip time being made a center.

5. The phase adjusting apparatus as claimed in claim 2, wherein the first and the second device respectively comprise a station end device and an antenna and device.

6. The phase adjusting apparatus as claimed in claim 2, wherein the first and the second system respectively comprises a working system and a protection system, in which the first device performs a phase adjustment between the working system-protection system.

7. The phase adjusting apparatus as claimed in claim 2, wherein the system comprises a card, in which the first device performs a phase adjustment between all of the cards.

8. The phase adjusting apparatus as claimed in claim 2, wherein the first and the second system respectively comprise a working system and a protection system, in which a plurality of cards including at least one of the working system and the protection system are provided, so that the first device performs a phase adjustment between the working system-protection system in all of the cards.

* * * * *